United States Patent
Yoshida et al.

(10) Patent No.: US 9,466,841 B2
(45) Date of Patent: Oct. 11, 2016

(54) BATTERY

(75) Inventors: Hiroaki Yoshida, Kyoto (JP); Keita Nakamura, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 498 days.

(21) Appl. No.: 13/564,817

(22) Filed: Aug. 2, 2012

(65) Prior Publication Data

US 2013/0034772 A1 Feb. 7, 2013

(30) Foreign Application Priority Data

Aug. 2, 2011 (JP) ................. 2011-169563

(51) Int. Cl.
| | |
|---|---|
| *H01M 4/66* | (2006.01) |
| *H01M 2/02* | (2006.01) |
| *H01M 2/30* | (2006.01) |
| *H01M 10/0525* | (2010.01) |
| *H01M 10/34* | (2006.01) |

(52) U.S. Cl.
CPC ............ *H01M 4/667* (2013.01); *H01M 2/029* (2013.01); *H01M 2/30* (2013.01); *H01M 4/669* (2013.01); *H01M 10/0525* (2013.01); *H01M 10/345* (2013.01)

(58) Field of Classification Search
CPC ............................ H01M 4/667; H01M 4/669
USPC ........................................................ 429/178
See application file for complete search history.

(56) References Cited

U.S. PATENT DOCUMENTS

| | | | |
|---|---|---|---|
| 6,632,538 B1 * | 10/2003 | Yamazaki et al. ............ 428/461 |
| 7,754,379 B2 | 7/2010 | Oogami et al. | |
| 2008/0292963 A1 | 11/2008 | Sato et al. | |
| 2010/0285352 A1 * | 11/2010 | Juzkow et al. ............... 429/163 |

FOREIGN PATENT DOCUMENTS

| | | |
|---|---|---|
| JP | 2000-215879 A | 8/2000 |
| JP | 2001-076706 A | 3/2001 |
| JP | 2001-126709 A | 5/2001 |
| JP | 2001-266813 A | 9/2001 |
| JP | 2004-039621 A | 2/2004 |
| JP | 2004-063133 A | 2/2004 |
| JP | 2005-116228 A | 4/2005 |
| JP | 2006-324143 A | 11/2006 |
| JP | 2009-004363 A | 1/2009 |
| JP | 2010-261150 A | 11/2010 |

* cited by examiner

*Primary Examiner* — Basia Ridley
*Assistant Examiner* — James Erwin
(74) *Attorney, Agent, or Firm* — McGinn IP Law Group, PLLC

(57) ABSTRACT

Provided is a battery having an outer package made of a laminated film, and further with a terminal having a plate-form first metal layer, and second metal layers laid over both surfaces of the first metal layer, respectively. The terminal is sandwiched between portions of the resin layer or between the resin layers, and at its sandwiched region the second metal layers of the terminal contact the resin layer(s) of the laminated film.

11 Claims, 5 Drawing Sheets

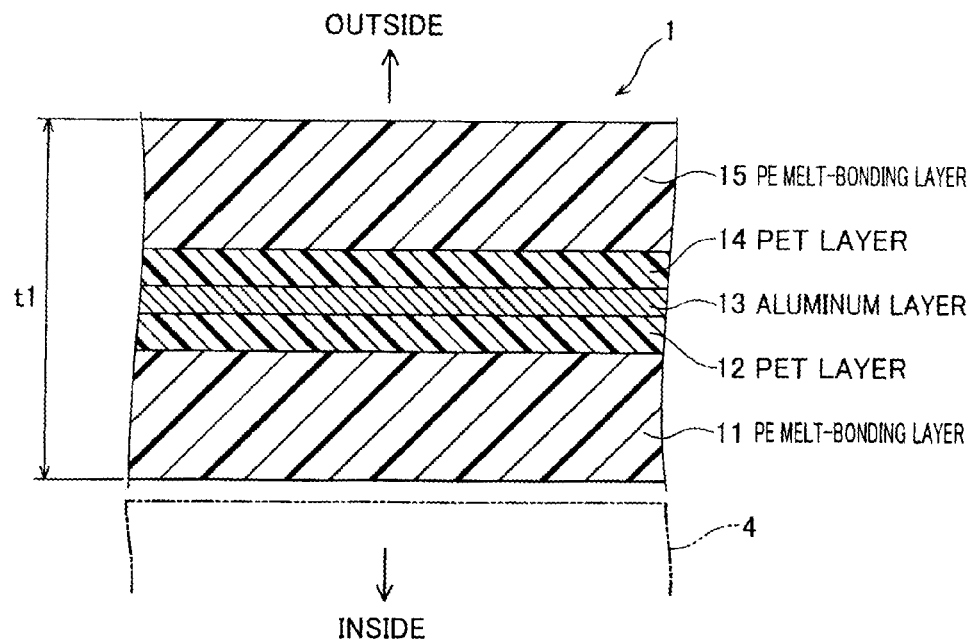
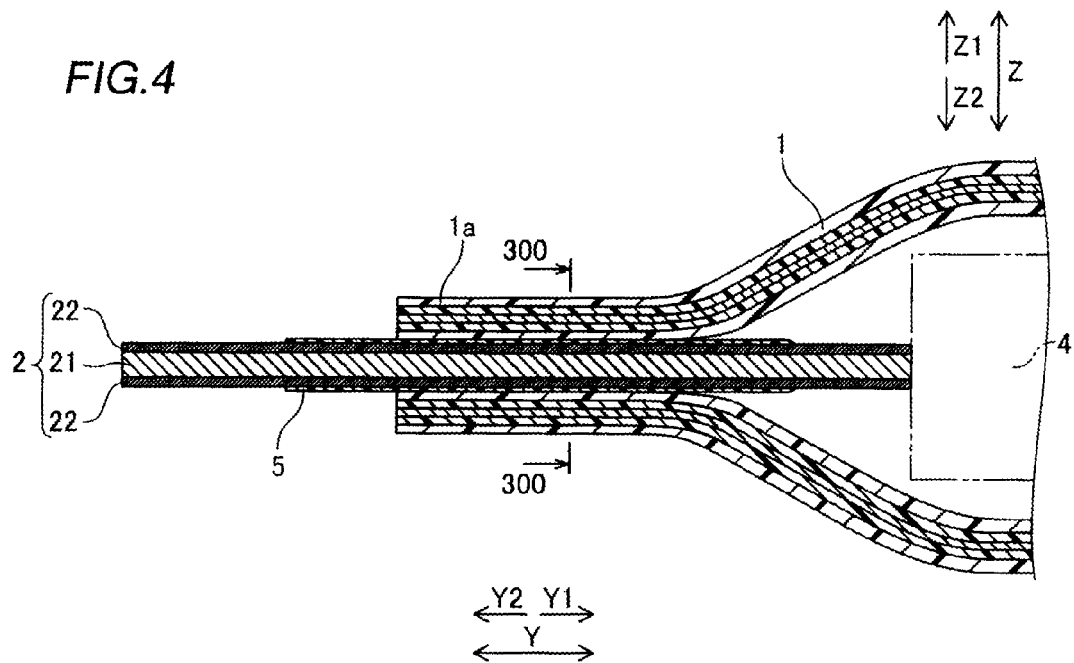

BATTERY

BACKGROUND OF THE INVENTION

1. Field of the Invention

This invention relates to a battery, in particular, a battery having an outer package made of a laminated film.

2. Description of the Related Art

JP-A-2006-324134 discloses a secondary battery having an outer package having a melt-bonded region formed by melt-bonding portions of a resin layer of a laminated film to each other, and a positive electrode terminal protruded outward from the outer package across the melt-bonded region. This positive electrode terminal has a laminated structure composed of a first region (first layer) made of aluminum, and a second region (second layer) made of Al alloy, copper, nickel or iron, thereby being heighten in mechanical strength.

However, in the secondary battery of the publication, the second region, which is made of Al alloy, copper, nickel or iron, is high in thermal conductivity so that heat is easily conducted from the positive electrode terminal to localized sites of the resin layer of the laminated film, the heat being heat generated when the positive electrode terminal is welded to an external terminal, or Joule heat generated when a large quantity of electric current is caused to flow into the positive electrode terminal. As a result, the resin layer of the laminated film that contacts the positive electrode terminal is partially softened, so as to be declined in bonding strength. Thus, there is caused a problem that the sealing performance of the outer package is declined.

SUMMARY OF THE INVENTION

This invention has been made to solve problems as described above, and an object of the invention is to provide a battery having an outer package restrained from being declined in sealing performance by heat.

A first aspect of the present invention is a battery comprising an outer package comprising a laminated film having one or more resin layers, and a terminal having a plate-like first metal layer, and second metal layers arranged on both surfaces of the first metal layer, respectively, wherein the outer package is formed by bonding portions of the resin layer of the laminated film to each other, or by bonding the resin layers thereof to each other, the terminal is sandwiched between the portions of the resin layer or between the resin layers, and at its sandwiched region the second metal layers of the terminal contact the resin layer or the resin layers of the laminated film.

This structure makes it possible to disperse heat from the first metal layer of the terminal to wide ranges through the second metal layers arranged on both the surfaces of the first metal layer, respectively. In this structure, it is possible to prevent a phenomenon that the heat from the first metal layer of the terminal is conducted to localized sites of the resin layer or the resin layers of the laminated film so that the resin layer or the resin layers of the laminated film is/are softened. As a result, the bonded region of the laminated film can be prevented from being lowered in bonding strength, so that the outer package can be restrained from being declined in sealing performance. In addition, since the second metal layers are arranged on both the surface of the first metal layer, the terminal can gain mechanical strength.

In the battery of the present invention, it is preferred that thermal conductivity of the metal constituting the second metal layers is smaller than that of the metal constituting the first metal layer. This matter, i.e., a matter that thermal conductivity of the metal the second metal layers is smaller than that of the metal constituting the first metal layer, makes it possible to decrease a heat quantity transferred from the first metal layer to the resin layer or the resin layers of the laminated film. As a result, the bonded region of the laminated film can be restrained from being declined in bonding strength. The metal of the second metal layers is in particular preferably titanium or stainless steel.

It is preferred that each of the second metal layers of the terminal contacts the resin layer of the laminated film with a second resin layer which is different from the resin layer of the laminated film interposed therebetween. When joining strength is not easily obtained between each of the second metal layers of the terminal and the resin layer of the laminated film, the second resin layer is arranged on the surface of the second metal layer of the terminal, whereby the second resin layer can be joined to the resin layer of the laminated film. The laying of the second resin layer makes it possible to decrease a heat quantity transferred from the first metal layer to the resin layer of the laminated film.

BRIEF DESCRIPTION OF THE DRAWINGS

The forgoing and other features of the invention will become apparent to one skilled in the art to which the invention relates upon consideration of the invention with reference to the accompanying drawings, wherein:

FIG. 3 is a sectional view illustrating a layer structure of an outer package of the battery of the embodiment of the present invention;

FIG. 4 is an enlarged sectional view illustrating a positive electrode terminal of the battery according to the embodiment of the present invention;

DETAILED DESCRIPTION OF THE INVENTION

Hereinafter, preferred embodiments of the present invention will be described with reference to the attached drawings. First, with reference to FIGS. 1 to 5, a description will be made about the structure of a battery 100 according to one embodiment of the present invention.

Figure 1:
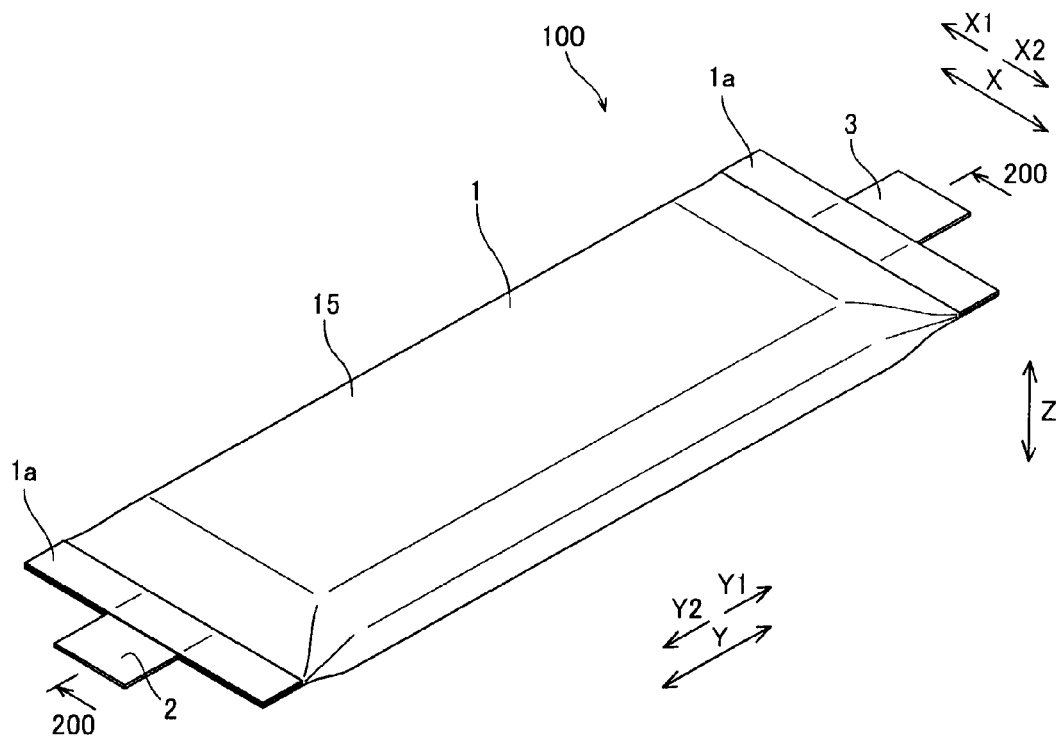
FIG. 1 is a perspective view illustrating an entire structure of a battery according to an embodiment of the present invention.
Figure 2:
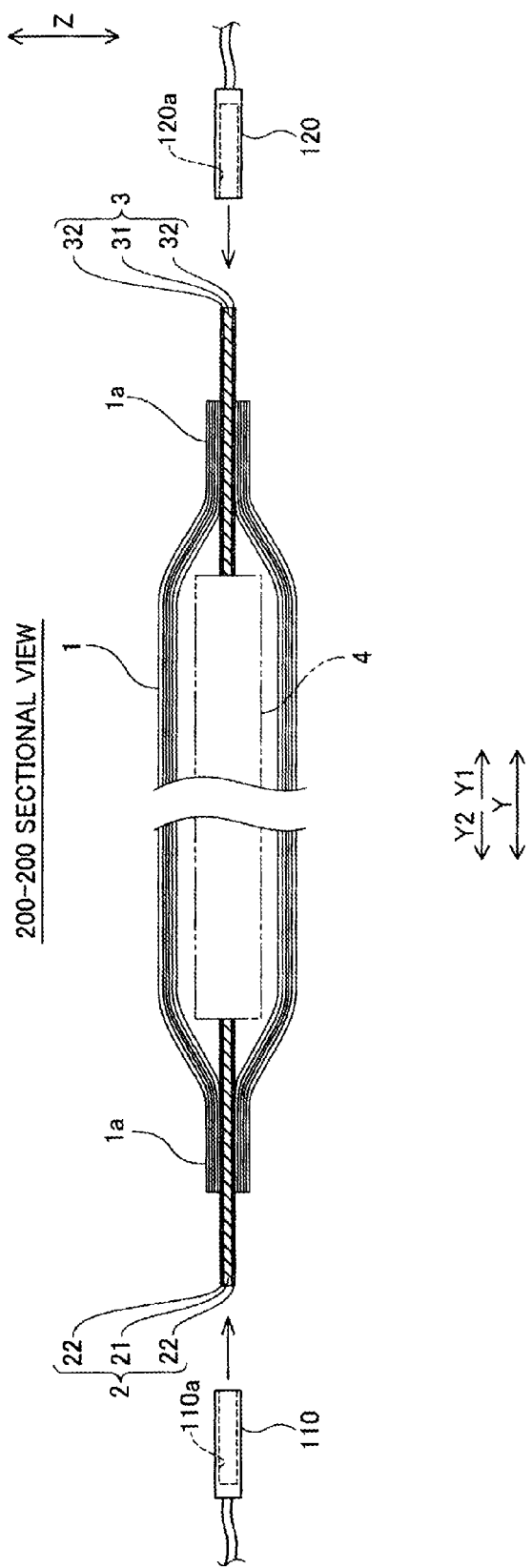
FIG. 2 is a sectional view of the battery taken along a line 200-200 in FIG. 1.

The battery 100 of one embodiment of the present invention is a lithium ion battery having a discharge capacity of 10 Ah or more. As illustrated in FIGS. 1 and 2, the battery 100 has an outer package 1 made of a laminated film, and a positive electrode terminal 2 and a negative electrode terminal 3 that are protruded outward, respectively, from both ends in Y direction of the battery 100. As illustrated in FIG. 2, the outer package 1 holds therein a power generating element 4, and an electrolyte solution. The positive electrode terminal 2 and the negative electrode terminal 3 are each an example of the "terminals" referred to in the present invention.

The outer package 1 is formed into a cylindrical form by melt-bonding both edges of a sheet made of the laminated film to each other. As illustrated in FIGS. 1 and 2, the outer package 1 has, at each of both end portions in Y direction of the battery 100, a melt-bonded region 1a formed by melt-bonding faced portions of the inside surface of the laminated film to each other. About the melt-bonded regions 1a at both the end portions of the battery 100, the melt-bonding is attached in the state that the positive electrode terminal 2 and the negative electrode terminal 3 are sandwiched. As illustrated in FIG. 3, the laminated film constituting the outer package 1 has a laminated structure in which a polyethylene (PE) melt-bonding layer 11, a polyethylene terephthalate (PET) layer 12, an aluminum layer 13, a PET layer 14 and a PE melt-bonding layer 15 are laminated in this order from the inside of the battery toward the outside. The thickness (total thickness) t1 of the laminated film is made into the range of 150 μm or more and 500 μm or less. Between the aluminum layer 13 and each of the PET layers 12 and 14, an adhesive layer is laid for bonding the aluminum layer 13 to the PET layer.

The PE melt-bonding layers 11 and 15 are each made of polyethylene, which is a thermoplastic resin, and has a melting point of about 130° C. The thickness of each of the PE melt-bonding layers 11 and 15 ranges from about 40 μm or more and about 200 μm or less, preferably from about 80 μm or more and about 150 μm or less. The aluminum layer 13 is a piece of aluminum foil that has a thickness of about 4 μm or more and about 100 μm or less, and the piece is laid in the form of one of the laminated layers inside the outer package 1 made of the laminated film.

Figure 5:
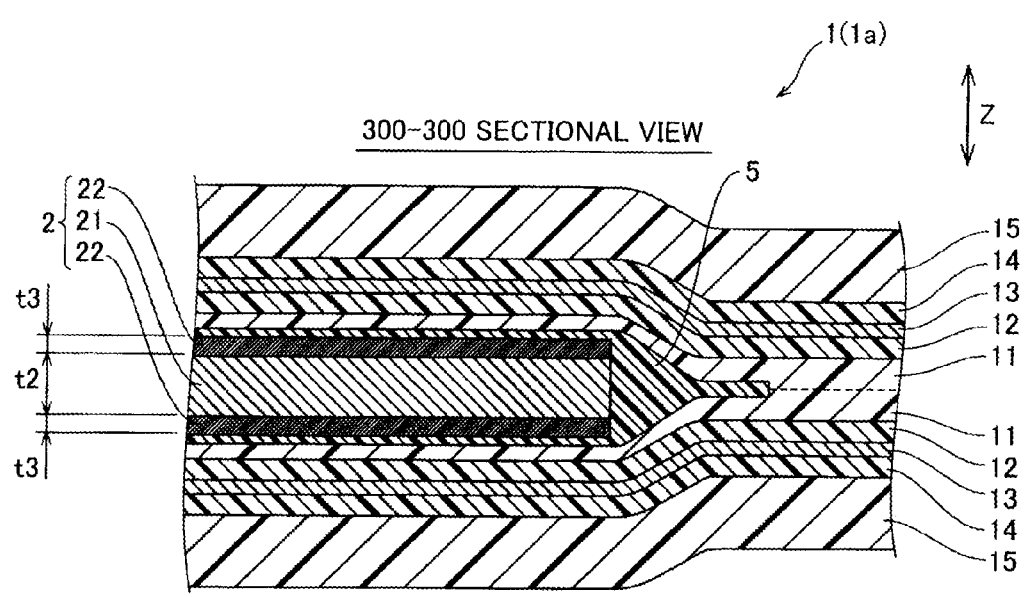
FIG. 5 is a sectional view of the terminal taken along a line 300-300 in FIG. 4.

In the present embodiment, the positive electrode terminal 2 is a flat plate form. As illustrated in FIGS. 1 and 2, the terminal 2 is arranged to be protruded outward from the outer package 1 across one of the melt-bonded regions 1a in Y direction of the outer package 1. The positive electrode terminal 2 is connected to a positive electrode of the power generating element 4 inside the outer package 1. As illustrated in FIGS. 4 and 5, the positive electrode terminal 2 is a laminated body formed by rolling a first metal layer 21 made of aluminum, and second metal layers 22 made of titanium in such a manner that the layer 21 can be joined with each of the layers 22.

Detailedly, the second metal layers 22 are laid on both surfaces of the first metal layer 21, which is in a plate form, respectively; the surfaces are specifically the front side surface (Z1 direction surface) of the layer 21, and the rear side surface (Z2 direction surface) thereof. As illustrated in FIG. 5, the first metal layer 21 has a thickness t2 of 0.1 mm or more and 1.0 mm or less. The second metal layers 22 each have a thickness t3 of 50 μm or more and 500 μm or less. The second metal layers 22 made of titanium are small in thermal conductivity than the first metal layer 21 made of aluminum. The thermal conductivity of the first metal layer 21 is about 241 W/(m•K) while that of the second metal layers 22 is about 22 W/(m•K).

As illustrated in FIGS. 4 and 5, a melt-bonding assisting member 5 is set to cover the outer circumference of the positive electrode terminal 2. The melt-bonding assisting member 5 is made of a thermoplastic resin such as polypropylene. When the melt-bonding of one of the melt-bonded regions 1a of the outer package 1 is thermally attained, the melt-bonding assisting member 5 is melt-bonded together with the PE melt-bonding layer 11. In this way, the melt-bonded region 1a of the outer package 1 can be certainly melt-bonded in the state that the positive electrode terminal 2 is sandwiched. Since the melt-bonding assisting member 5 is interposed between each of the second metal layer 22 of the positive electrode terminal 2 and the PE melt-bonding layer 11 of the laminated film, it is possible to decrease a heat quantity conducted from the positive electrode terminal 2 to the PE melt-bonding layer 11 of the laminated film. The melt-bonding assisting member 5 is an example of the "second resin layer" referred to in the present invention.

In the present embodiment, the negative electrode terminal 3 is a flat plate form. As illustrated in FIGS. 1 and 2, the terminal 3 is arranged to be protruded outward from the outer package 1 across the other of the melt-bonded regions 1a in Y direction of the outer package 1. The negative electrode terminal 3 is connected to a negative electrode of the power generating element 4 inside the outer package 1. The negative electrode terminal 3 has a first metal layer 31 made of copper, and second metal layers 32 laid on both surfaces of the first metal layer 31, respectively. In the same manner as in the positive electrode terminal 2, the second metal layers 32 are made of titanium. The first metal layer 31 made of copper has a thermal conductivity of about 420 W/(m•K).

In the embodiment, the positive electrode terminal 2 is formed as a laminated body having the first metal layer 21 made of aluminum, and the second metal layers 22 made of titanium and laid on both the surfaces of the first metal layer 21, respectively. The structure of the positive electrode terminal 2 makes the following possible: in a case where heat is generated when the positive electrode terminal 2 is welded to an external terminal or Joule heat is generated when a large quantity of electric current flows into the positive electrode terminal 2, the heat diffuses from the first metal layer 21 of the positive electrode terminal 2 through the second metal layers 22 into wide ranges to prevent the heat from being conducted to localized sites of the PE resin layer 11 of the laminated film.

This matter makes it possible to restrain a phenomenon that the PE resin layer 11 of the laminated film is softened by heat so that the sealing performance of the outer package 1 is declined. Furthermore, the second metal layers 22 made of titanium are smaller in thermal conductivity than the first metal layer 21 made of aluminum; this matter makes it possible to make small a heat quantity transferred from the first metal layer 21 of the positive electrode terminal 2 to the PE resin layer 11 of the laminated film. The negative electrode terminal 3 can also gain the same advantageous effects since the terminal has the same structure.

Moreover, the second metal layers 22 are made of titanium, which is larger in mechanical strength than aluminum; thus, the second metal layers 22 can heighten the mechanical strength of the positive electrode terminal 2. This matter makes it possible that when the positive electrode terminal 2 is inserted into an inside hollow 110 in a connector 110, the positive electrode terminal 2 is restrained from being deformed.

In the embodiment, each of the second metal layers 22 of the positive electrode terminal 2 is made into a thickness of 50 μm or more and 500 μm or less. When the thickness of the second layer 22 is set to 50 μm or more, the mechanical strength of the positive electrode terminal 2 can be effectively heightened. When the thickness of the second metal layer 22 is set to 500 μm or less, the thickness of the positive electrode terminal 2 is restrained from being excessively increased so that the melt-bonding of the melt-bonded region 1a can be attained with a good precision. The negative electrode terminal 3 can also gain the same advantageous effects since the terminal has the same structure.

Figure 6:
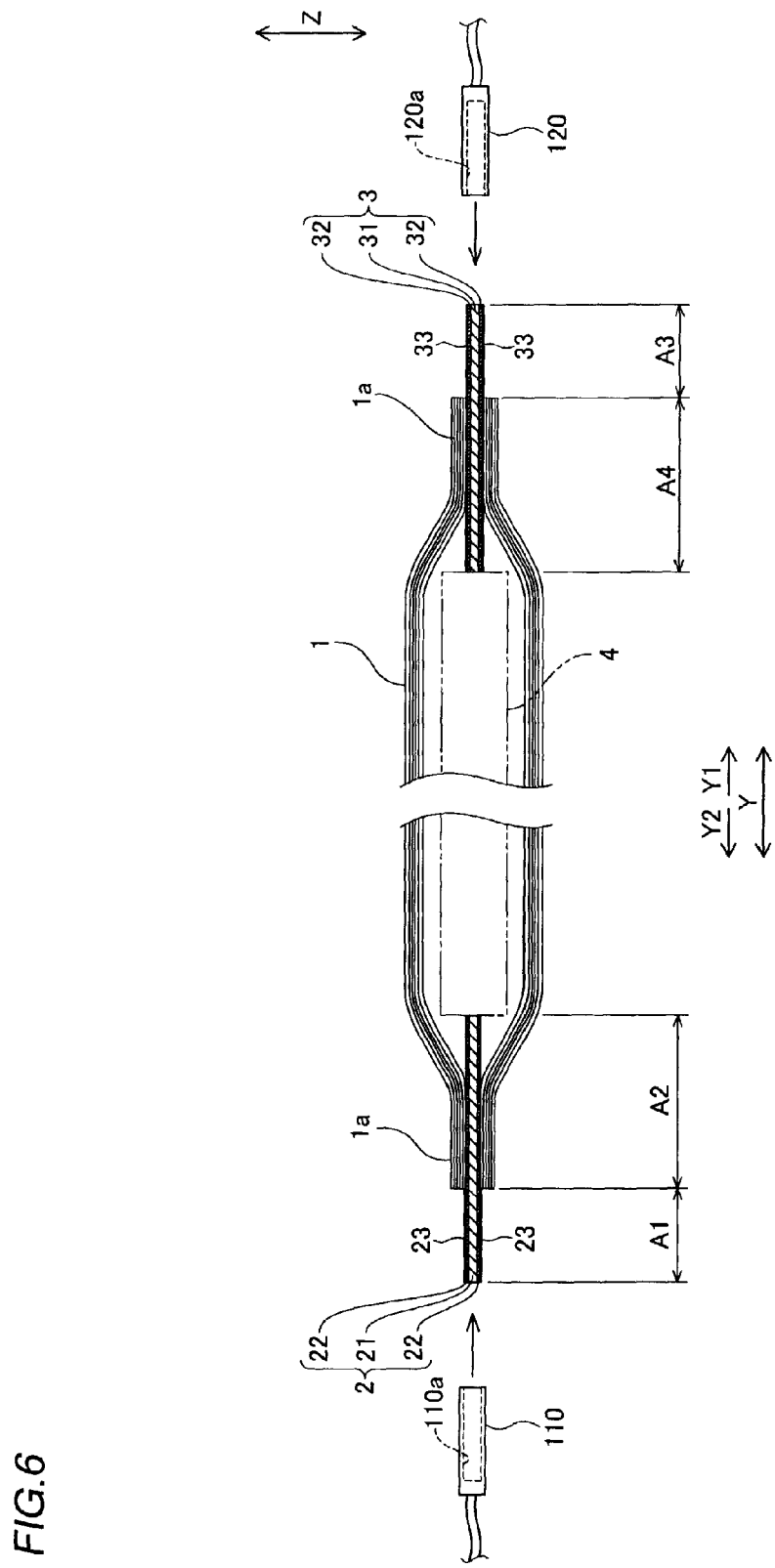
FIG. 6 is a sectional view of a battery according to another embodiment of the present invention.

As illustrated in FIG. 6, in another embodiment of the present invention, a Ni plating layer 23 can be formed on the outside surface of each second metal layer 22 of a positive electrode terminal 2. The Ni plating layer 23 makes it possible to improve the positive electrode terminal 2 in corrosion resistance. Moreover, the Ni plating layer 23 makes it possible to make the surface roughness of the positive electrode terminal 2 small to decrease the contact resistance of the positive electrode terminal 2. When the positive electrode terminal 2 is inserted into an inside hollow 110a in a connector 110, this decrease makes small the contact resistance between the positive electrode terminal 2 and the inside hollow 110a. Therefore, the positive electrode terminal 2 can easily be inserted into the inside hollow 110a in the connector 110. The Ni plating layer may be unfavorably melted at a side thereof near the positive electrode terminal 2. Thus, no Ni plating layer is formed on an inside region A2 of an outer package 1 of the positive electrode terminal 2.

The embodiments disclosed herein should be interpreted to be merely exemplificative in every point, and not to be restrictive. The scope of the present invention is not specified by the above-mentioned description of the embodiments but specified by the claims. Modified embodiments each having a meaning and a scope equivalent to those based on the claims are wholly included in the scope of the present invention.

In the above-mentioned embodiments, for the first metal layer of its positive electrode terminal, and that of its negative electrode terminal, aluminum and copper are used, respectively. However, the present invention is not limited into this manner. In the present invention, for a first metal layer of its positive electrode terminal, and one of its negative electrode terminal, an aluminum alloy and a copper alloy may be used, respectively.

In the embodiments, as its second metal layers, layers made of titanium have been described. However, the present invention is not limited into this manner. In the present invention, second metal layers made of stainless steel may be used. In this case, SUS 316, which is not easily soluble in an electrolyte solution, is preferred. For reference, stainless steel has a thermal conductivity of about 12 W/(m•K). In the present invention, its second metal layers may contain a component other than titanium or stainless steel.

In the embodiments, as the structure thereof, a structure has been described wherein second metal layers made of titanium are laid on both surfaces of a first metal layer, respectively. However, the present invention is not limited into this structure. The second metal layer laid on one of the surfaces of the first metal layer may be different in metal as a raw material from the second metal layer laid on the other surface of the first metal layer. For example, it is allowable to lay a second metal layer made of titanium on one of the surfaces of a first metal layer, and lay a second metal layer made of stainless steel on the other surface of the first metal layer.

In the embodiments, as the structure of each of its positive and negative electrode terminals, a structure has been described wherein a first layer is jointed to second layers by rolling. However, the present invention is not limited into this structure. In the present invention, its terminals may each have, for example, a laminated structure wherein a first layer is jointed to second layers through an adhesive.

In another embodiment illustrated in FIG. 6, as the metal plating layer in the present invention, a Ni plating layer has been described. However, the present invention is not limited into this manner. In the present invention, it is allowable to use a metal plating layer other than the Ni plating layer, for example, a metal plating layer made of gold, silver, tin or lead.

In the embodiments, in each of its positive and negative electrode terminals, a laminated body composed of a first metal layer and second metal layers is used. However, the present invention is not limited to this manner. In the present invention, it is allowable to render only one of its positive and negative electrode terminals a laminated body composed of a first metal layer and second metal layers. It is also allowable in the present invention that the material of second metal layers of the positive electrode terminal is different from that of second metal layers of the negative electrode terminal thereof.

In the embodiments, examples have been described wherein the battery of the present invention is applied to a lithium ion battery. However, the present invention is not limited into this manner. The battery of the present invention may be applied to a nonaqueous electrolyte battery other than lithium ion batteries, and may be applied to an aqueous electrolyte battery such as a nickel hydrogen battery.

What is claimed is:

1. A battery, comprising:
   an outer package comprising a laminated film comprising one or more resin layers;
   a terminal including a plate-like first metal layer, and second metal layers arranged on both surfaces of the first metal layer; and
   a melt-bonding assisting member comprising a thermoplastic resin through which at least a part of each of the second metal layers of the terminal contacts the one or more resin layers of the laminated film,
   wherein the outer package comprises a melt-bonded region at which the terminal is sandwiched between the one or more resin layers,
   wherein the terminal comprises an inner part disposed inside the outer package, an outer part disposed outside the outer package, and a sandwiched part disposed between the inner and outer parts and sandwiched between the one or more resin layers, the inner part, the sandwiched part, and the outer part being arranged in a first direction, the first direction being a longitudinal direction of the terminal,
   wherein the second metal layers are disposed at least on the sandwiched part,
   wherein the melt-bonding assisting member is disposed at least in the melt-bonded region,
   wherein, in a second direction, the melt bonding assisting member covers end surfaces of the first metal layer and the second metal layers at least in the melt-bonded region, the second direction being a width direction of the terminal perpendicular to the first direction, and
   wherein the melt-bonding assisting member internally extends in the first direction beyond contact with the outer package.

2. The battery according to claim 1, wherein a thermal conductivity of the metal constituting the second metal layers is smaller than that of the metal constituting the first metal layer.

3. The battery according to claim 2, wherein a metal of the second metal layers comprises a metal selected from the group consisting of stainless steel and titanium.

4. The battery according to claim 3, wherein a metal of the first metal layer comprises a metal selected from the group consisting of aluminum, copper, an aluminum alloy, and a copper alloy.

5. The battery according to claim 1, wherein the second metal layers extend over the sandwiched part and at least one of the inner and outer parts of the terminal.

6. The battery according to claim 1, wherein a thickness of each of the second metal layer is 50μ or more and 500μ or less.

7. The battery according to claim 1, further comprising a metal plating layer disposed on the outer part of the terminal.

8. A battery, comprising:
an outer package comprising a laminated film comprising one or more resin layers;
a terminal including a plate-like first metal layer, and second metal layers arranged on both surfaces of the first metal layer; and
a melt-bonding assisting member comprising a thermoplastic resin through which at least a part of each of the second metal layers of the terminal contacts the one or more resin layers of the laminated film,
wherein the outer package comprises a melt-bonded region at which the terminal is sandwiched between the one or more resin layers,
wherein the terminal comprises an inner part disposed inside the outer package, an outer part disposed outside the outer package, and a sandwiched part disposed between the inner and outer parts and sandwiched between the one or more resin layers, the inner part, the sandwiched part and the outer part being arranged in a first direction, the first direction being a longitudinal direction of the terminal,
wherein the melt-bonding assisting member is interposed between each of the second metal layers and the one or more resin layers, and, in a second direction, the melt-bonding assisting member covering end surfaces of the first metal layer and the second metal layers at least in the melt-bonded region, the second direction being a width direction of the terminal perpendicular to the first direction,
wherein the second metal layers and the melt-bonding assisting member extend beyond the sandwiched part of the terminal, and
wherein the melt-bonding assisting member internally extends in the first direction beyond contact with the outer package.

9. The battery according to claim 1, wherein the melt bonding assisting member covers an outer circumference of the terminal.

10. The battery according to claim 8, wherein the melt bonding assisting member covers an outer circumference of the terminal.

11. A battery, comprising:
an outer package comprising a laminated film comprising one or more resin layers;
a terminal including a plate-like first metal layer, and second metal layers arranged on both surfaces of the first metal layer; and
a melt-bonding assisting member comprising a thermnoplastic resin through which at least a part of each of the second metal layers of the terminal contacts the one or more resin layers of the laminated film,
wherein the outer package comprises a melt-bonded region at which the terminal is sandwiched between the one or more resin layers,
wherein the terminal comprises an inner part disposed inside the outer package, an outer part disposed outside the outer package, and a sandwiched part disposed between the inner and outer parts and sandwiched between the one or more resin layers, the inner part, the sandwiched part, and the outer part being arranged in a first direction, the first direction including an extension direction of the terminal,
wherein the second metal layers are disposed at least on the sandwiched part,
wherein the melt-bonding assisting member is disposed at least in the melt-bonded region,
wherein, in a second direction, the melt bonding assisting member covers end surfaces of the first metal layer and the second metal layers at least in the melt-bonded region, the second direction including another extension direction of the terminal perpendicular to the first direction, and
wherein the melt-bonding assisting member internally extends in the first direction beyond contact with the outer package.

* * * * *